J. V. PHILLIPS.
Hold-Back.

No. 163,884.   Patented June 1, 1875.

WITNESSES:
Wm Beale Hale.
Philip W. Hale,

INVENTOR.
John V. Phillips,
pr Geo W. Richards
Attorney.

THE GRAPHIC CO.PHOTO-LITH.39 & 41 PARK PLACE,N.Y.

UNITED STATES PATENT OFFICE.

JOHN V. PHILLIPS, OF NEW BUFFALO, MICHIGAN.

IMPROVEMENT IN HOLDBACKS.

Specification forming part of Letters Patent No. 163,884, dated June 1, 1875; application filed April 15, 1875.

*To all whom it may concern:*

Be it known that I, JOHN V. PHILLIPS, of New Buffalo, in the county of Berrien and State of Michigan, have invented certain new and useful Improvements in Holdbacks; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention consists in a peculiar construction of tongue to be attached to holdback-straps, and to a socket for receiving said tongue, and to be attached to the thills or shafts of carriages.

The object of my invention is to render the holdback self-detachable in case of breakage of the whiffletree, or breakage or unfastening of a trace or traces, in order that, in either of such cases, the horse may be immediately relieved of all connection with the thills, while at the same time an efficient attachment of the holdback is secured as long as desirable.

Figure 1:
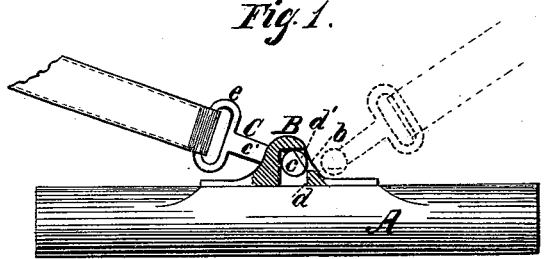
Figure 2:
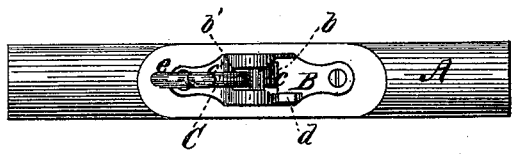

In the drawing, Figure 1 is a side view, partly in section, showing the socket attached to a thill and the tongue inserted, the dotted lines showing the position in which the tongue is first inserted. Fig. 2 is a plan view.

A represents one of the thills or shafts of a carriage or other one-horse vehicle. B is the socket, secured to the thill by means of screws, or in any other suitable manner. This socket is cast in about the shape shown in the drawing, and has a forward opening, $b$, through which the enlarged portion or head $c$ of the tongue C is inserted, and a narrower rear opening or slot, $b'$, through which the stem or shank $c'$ extends when the horse is properly hitched and the tugs and whiffletree intact. At one of the lower corners of the forward opening $b$ is formed a shoulder, $d$, and in one end of the cylindrical head $c$ is a notch, $d'$. The tongue consists of stem or shank $c'$, terminated at one end by a transverse cylindrical head, $c$, provided with notch $d'$, and at the other end by an eye, $e$, by which the holdback-strap is attached.

In hitching up a horse, the tongue C is held in the position shown in dotted lines, Fig. 1, so that notch $d'$ will coincide with shoulder $d$, and is in this position first inserted in opening $b$, and then turned back to the position shown in full lines, so that the stem or shank $c'$ extends through slot $b'$, the sides of said slot forming catches for the ends of head $c$. The tugs being hitched to the whiffletree, the holdback is retained in this position, and the notch $d'$ is held away from the shoulder $d$, so that the full length of head $c$ is presented at opening $b$, and said head cannot pass out on account of shoulder $d$. No matter how much jolting the gait of the horse or roughness of the road subjects the holdback to, it will be retained approximately in the position shown in full lines, Fig. 1, as long as the tugs or traces are properly hitched and the whiffletree unbroken. But whenever the tugs are unhitched or the whiffletree broken, the holdback-strap will fall, and as the horse moves forward it becomes automatically detached from the thill by the head $c$ slipping out of the socket, in the position shown in Fig. 1 by dotted lines, the notch $d'$ passing by shoulder $d$.

I am aware of the patent which was granted to Garrison and Stephens, May 4, 1869, and numbered 89,573, and I hereby disclaim the invention covered by said patent; but

Having now described the construction and operation of my invention, I claim—

In a holdback attachment, the combination of tongue C, having notched cross-head $c$ and socket B, provided at its entrance with a shoulder, substantially as and for the purpose set forth.

In testimony that I claim the foregoing as my own invention, I affix hereto my signature in presence of two witnesses.

JOHN V. PHILLIPS.

Witnesses:
CHARLES HARMON,
U. N. BECKTELL.